United States Patent [19]

Odekirk

[11] Patent Number: 5,492,680
[45] Date of Patent: Feb. 20, 1996

[54] SEPARATION OF SCANDIUM FROM TANTALUM RESIDUE USING FRACTIONAL LIQUID-LIQUID EXTRACTION

[75] Inventor: Michael D. Odekirk, Kaysville, Utah

[73] Assignee: The United States of America as represented by the Secretary of the Interior, Washington, D.C.

[21] Appl. No.: 285,676

[22] Filed: Aug. 4, 1994

[51] Int. Cl.⁶ .................................................. C01F 17/00
[52] U.S. Cl. ........................ 423/21.5; 423/21.1; 210/634; 210/639; 210/912
[58] Field of Search .................................. 210/634, 639, 210/912; 423/21.1, 21.5

[56] References Cited

U.S. PATENT DOCUMENTS

| | | | |
|---|---|---|---|
| 2,866,680 | 12/1958 | Long | 423/21.5 |
| 2,993,752 | 7/1961 | Lewis et al. | 423/21.1 |
| 3,146,063 | 8/1964 | Moore et al. | 423/21.5 |
| 3,582,290 | 6/1971 | Grinstead | 423/21.1 |
| 4,311,676 | 1/1982 | Demarthe et al. | 423/21.5 |
| 4,624,703 | 11/1986 | Vanderpool et al. | 423/21.1 |
| 4,626,280 | 12/1986 | Vanderpool et al. | 423/21.1 |
| 4,647,438 | 3/1987 | Sabot et al. | 423/21.5 |
| 4,718,995 | 1/1988 | Vanderpool et al. | 423/21.5 |
| 4,718,996 | 1/1988 | Vanderpool et al. | 423/21.5 |
| 4,808,384 | 2/1989 | Vanderpool et al. | 423/21.5 |
| 4,898,719 | 2/1990 | Rourke et al. | 423/21.5 |
| 5,192,443 | 3/1993 | Delloye et al. | 210/634 |

*Primary Examiner*—Robert A. Dawson
*Assistant Examiner*—Kenneth M. Jones
*Attorney, Agent, or Firm*—E. Philip Koltos

[57] ABSTRACT

A process for separating scandium from an aqueous solution comprised of a first group of metals, scandium and a second group of metals includes the steps of: (a) providing a scandium-containing material and preparing therefrom an aqueous sulfuric acid solution containing a first group of metals, scandium and a second group of metals; (b) contacting the aqueous sulfuric acid solution with an organic liquid solution whereby scandium and the first and second groups of metals are extracted into the organic liquid solution to create a loaded organic solution; (c) scrubbing the loaded organic liquid solution first with an sulfuric acid solution to remove selected metals in the first group of metals from the organic liquid solution and then with a dilute HF solution to prepare the organic liquid solution for stripping; (d) stripping the remaining metals in the first group of metals from the loaded organic liquid solution with a HF solution so that only scandium and the second group of metals remain on the organic liquid solution; and (e) using a fractional stripping system to strip scandium from the loaded organic liquid solution with a HF solution so that the scandium is released from the organic liquid solution and only the second group of metals remains on the organic liquid solution.

18 Claims, 7 Drawing Sheets

SEPARATION OF SCANDIUM FROM TANTALUM RESIDUE USING FRACTIONAL LIQUID-LIQUID EXTRACTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to a process for separating scandium from an aqueous solution and, more particularly, to such a process which utilizes fractional liquid-liquid extraction techniques.

2. Description of the Prior Art

As is well known in the art, an aqueous solution such as a tantalum residue is a very complex material containing over twenty different metals. One of the metals present in tantalum residue is scandium. It is recognized by all who work in this area that it would be very advantageous to be able to recover scandium from tantalum residue, since scandium has use in many commercial applications such as in lasers and aluminum alloys. Unfortunately, presently very little information is available on the recovery of scandium from tantalum residue. In fact, the U.S. Bureau of Mines is one of the only sources of publications directed to scandium recovery. Although little is known about recovering scandium from tantalum residue, some information is available regarding the recovery of scandium from other metal sources.

For example, in the late 1950's it was found that scandium poisoned the dodecyl phosphoric acid (DDPA) extractant used for uranium recovery. Researchers found that by stripping the organic with HF, a 10% scandium precipitate with numerous impurities was obtained. To acquire a pure product, the precipitate was digested in NaOH for four hours at 90 degrees C. The mixture was filtered and the residue was digested in HCl. The pH and temperature of the liquor were then adjusted to 4 and 100 degrees C., respectively. Oxalic acid was added under closely controlled conditions to precipitate scandium. By calcining the oxalate precipitate, a 99.5% $Sc_2O_3$ product was obtained.

A significant amount of work has been performed on recovering scandium from tungsten bearing material (i.e.— as disclosed in U.S. Pat. Nos. 4,718,995; 4,718,996; 4,808,384; 4,626,280 and 4,624,703). As part of the processes disclosed in these patents, scandium, as well as some iron and manganese are loaded on a mixture of alkyl primary amines (i.e.—Primene JMT diluted in alkyl benzenes). The scandium is stripped from the organic using 1 M to 4 M HCl. The scandium is then recovered by "conventional techniques", i.e. many additional purification stages. Currently, scandium is recovered from tungsten residue by the Mitsubishi Electric Corporation of Japan (refer to *Rare Metals*, "Preparation and Application of Scandium Compounds", 1990, pages 53 through 56). The organophosphate DEPHA is used to load scandium from a chloride leach solution, and scandium is recovered as $ScF_3$ with other impurities. The fluoride is then converted to hydrate and dissolved in HCl. This chloride solution is passed through ion exchange to remove Zr, Ti, Hr and Th. Calcium is removed by hydrolysis before scandium is precipitated with oxalate. Scandium oxalate is then roasted above 600 degrees C. to obtain pure $Sc_2O_3$.

Another process for recovering scandium from a tungsten source (refer to U.S. Pat. No. 4,898,719) uses thenoyltrifluoroacetone dissolved in an aromatic solvent as the organic. This process reportedly produces a fairly pure scandium product; however, there are significantly fewer impurities in this material than in tantalum residue. Ion exchange methods have also been developed for the recovery of scandium (refer to U.S. Pat. Nos. 4,765,909; 4,816,233; 4,965,053 and 4,968,504). This cumbersome technique was developed for recovering trace amounts of scandium from solution, and is inefficient for solutions containing significant concentrations of scandium.

As can be seen from the foregoing, all the known processes for obtaining scandium from aqueous solutions are complex and time consuming. In addition, all of the aforementioned processes must recover scandium from a precipitated form. Finally, and perhaps most importantly, none of these known processes is capable of recovering scandium from an aqueous solution such as a tantalum residue. Therefore, there is a need for a new process for recovering scandium from ores, residues and leach solutions containing scandium, and in particular for a new process for recovering scandium from tantalum residue.

SUMMARY OF THE INVENTION

The present invention is directed to a process for recovering scandium from an aqueous solution (such as that obtained when processing a tantalum residue) to satisfy the aforementioned need. The process of the present invention takes advantage of the occurrence of metal-metal exchange reactions by manipulating these reactions to achieve a high degree of separation of scandium from complex liquors obtained when processing tantalum residue. This high degree of separation results in an increased degree of scandium purification, and this increased purification allows the recovered scandium to be used with a minimum of further purification.

Accordingly, the present invention is directed to a process for separating scandium from an aqueous solution comprised of a first group of metals, scandium and a second group of metals. The process includes the steps of: (a) providing a scandium-containing material and preparing therefrom an aqueous sulfuric acid solution containing a first group of metals, scandium and a second group of metals; (b) contacting the aqueous sulfuric acid solution with an organic liquid solution whereby scandium and the first and second groups of metals are extracted into the organic liquid solution; (c) scrubbing the organic liquid solution first with an sulfuric acid solution to remove selected metals in the first group of metals from the organic liquid solution and then with a dilute HF solution to prepare the organic liquid solution for stripping; (d) stripping the metals remaining in the first group of metals from the organic liquid solution with a HF solution so that only scandium and the second group of metals remain on the organic liquid solution; and (e) using a fractional stripping system to strip scandium from the organic liquid solution with a HF solution so that the scandium is released from the organic liquid solution and only the second group of metals remains on the organic liquid solution.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Previously published research indicates that purification of scandium during solvent extraction is not possible and suggests the use of ion exchange coupled with several precipitation and dissolution stages as a means for obtaining a pure scandium product. The present invention establishes that for a liquid-liquid system consisting of a kerosene/di-2-ethylhexyl phosphoric acid or kerosene/2-ethylhexyl phosphonic acid organic phase and an HF-containing stripping aqueous phase, scandium can be effectively separated and purified from an aqueous solution containing zirconium, hafnium, uranium and other contaminant metals during the solvent extraction process due to the large separation factors which can occur in the system. The aqueous solution is obtained from sulfating and water leaching a tantalum residue. An important part of this invention is the methodology which utilizes the interdependency of distribution coefficients and separation factors to accomplish purification. It will be shown herein that conditions can be selected which result in large separation factors which in turn lead to a process design that will successfully separate and purify scandium liberated from a tantalum residue.

In the broadest sense, the process of the present invention includes the steps of: (a) providing a scandium-containing material and preparing therefrom an aqueous sulfuric acid solution containing a first group of metals, scandium and a second group of metals; (b) contacting the aqueous sulfuric acid solution with an organic liquid solution whereby scandium and the first and second group of metals are extracted into the organic liquid solution; (c) scrubbing the organic liquid solution first with an sulfuric acid solution to remove metals selected in the first group of metals from the organic liquid solution and then with a dilute HF solution to prepare the organic liquid solution for stripping; (d) stripping the metals remaining in the first group of metals from the organic liquid solution with a HF solution so that only scandium and the second group of metals remain on the organic liquid solution; and (e) using a fractional stripping system to strip scandium from the organic liquid solution with a HF solution so that the scandium is released from the organic liquid solution and only the second group of metals remains on the organic liquid solution.

An example of scandium separation from an aqueous solution obtained by processing in the form of a tantalum residue will be disclosed in the following text. It should be understood that the various steps disclosed in the following example, although described with respect to the separation of scandium from a solution obtained by processing a tantalum residue, may also be followed to separate scandium from other aqueous solutions including contaminant, multi-metal streams. An example solution used to illustrate how scandium can be separated from tantalum residue is a complex leach liquor which is prepared by sulfating and water leaching a tantalum process residue. In addition to scandium, the liquor contains more than 20 other metals.

The first step in the scandium separation process is to provide a scandium-bearing material and to prepare therefrom a scandium containing aqueous sulfuric acid solution For this example, the scandium bearing material is a tantalum residue and the scandium-containing aqueous sulfuric acid solution is prepared by sulfating and water leaching the tantalum residue. The second step is to contact the aqueous sulfuric acid solution with an organic phase liquid solution whereby scandium and the first and second metal groups (the metal values) are extracted into the organic solution which thus results in and is referred to as a loaded organic solution. For this example the organic phase consists of a 15 volume percent extractant such as di-2-ethylhexyl phosphoric acid or 2-ethylhexyl phosphonic acid and a 15 volume percent tri-butyl phosphate (TBP), diluted in a kerosene derivative containing 22.2 percent aromatics, 42 percent Naphthenes and 36 percent paraffins. The loading is carried out at an aqueous:organic (A:O) ratio of 1:2 for 10 minutes in a single continuous mixer-settler. It should be noted that conditions are dependent upon each specific scandium system (i.e.—concentrations of scandium and other metals in the system).

Figure 1:
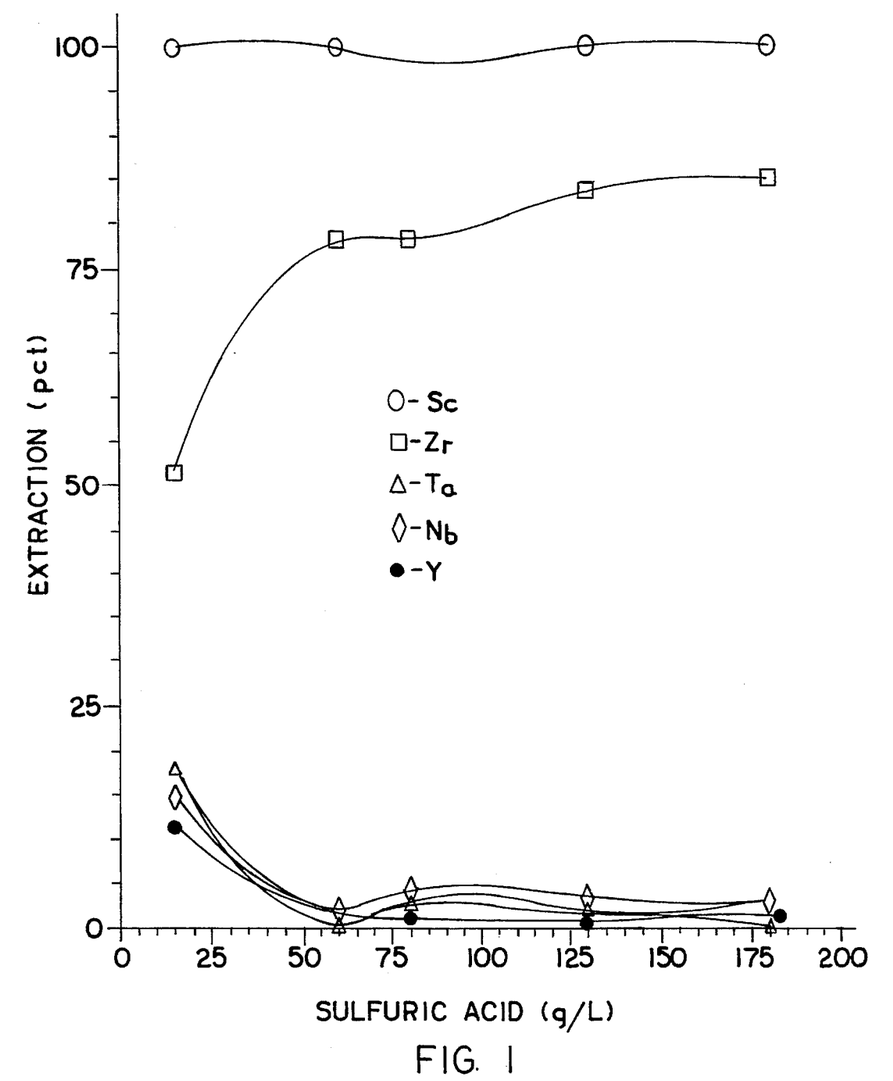
FIG. 1 is a graph illustrating the extraction of selected metals from a scandium containing solution as a function of sulfuric acid concentration for a di-2-ethylhexyl phosphoric acid organic phase utilized in the process of the present invention.
Figure 2:
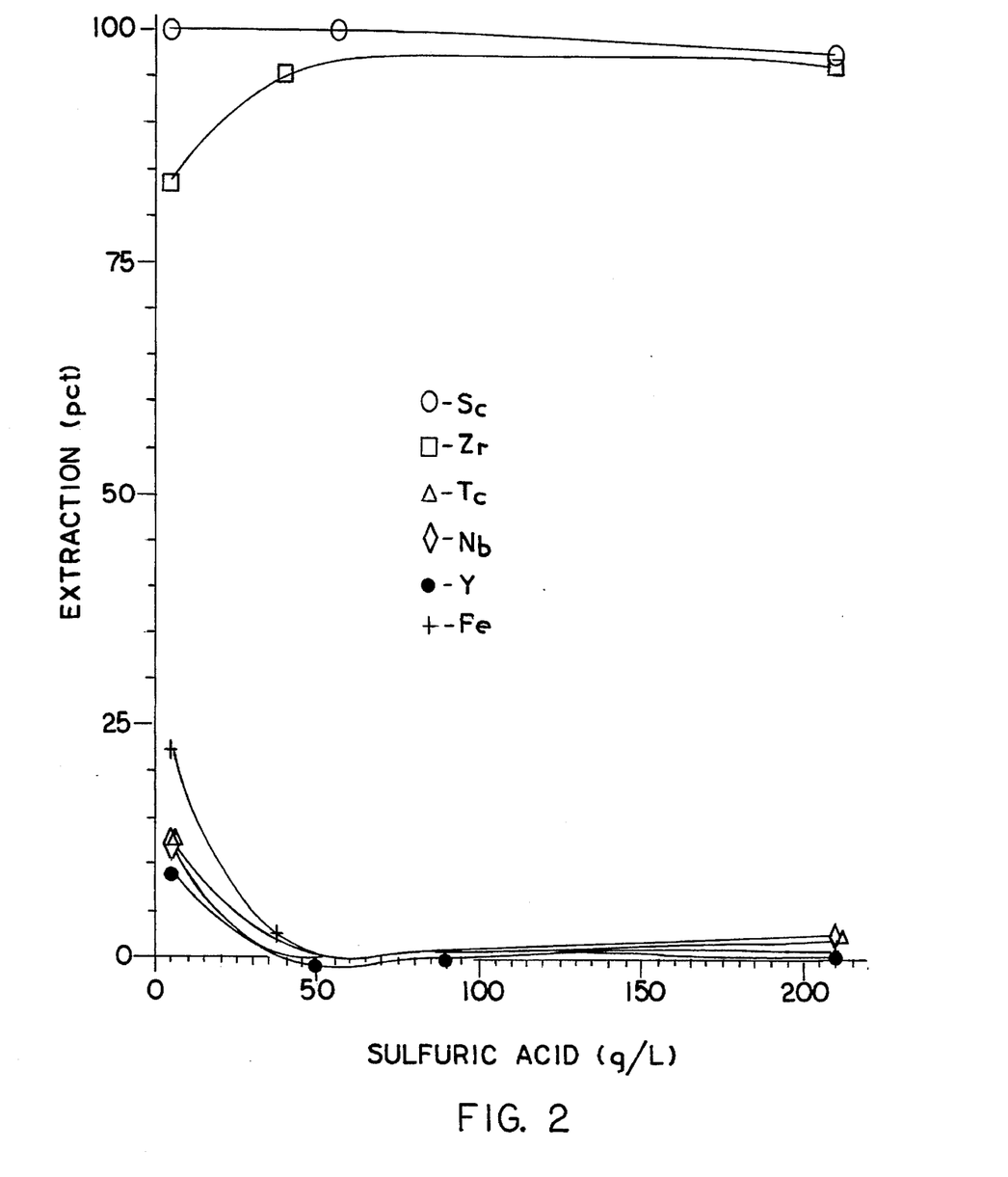
FIG. 2 is a graph illustrating the extraction of selected metals from a scandium containing solution as a function of sulfuric acid concentration for a 2-ethylhexyl phosphonic acid organic phase utilized in the process of the present invention.

FIGS. 1 and 2 show extraction for selected metals as a function of sulfuric acid concentration for di-2-ethylhexyl phosphoric acid and 2-ethylhexyl phosphonic acid systems. At all acid conditions, scandium is seen to favor the organic phase for both the phosphoric and phosphonic acid cases. It can be further seen that niobium, tantalum, yttrium, iron and other metals will be efficiently separated from scandium. In addition to the extraction of scandium, significant amounts of zirconium, hafnium, titanium, thorium and uranium are coextracted.

The third step in the process is to scrub the organic liquid solution first with a sulfuric acid solution to remove thorium and entrained metals and then with a dilute HF solution to prepare the organic liquid solution for an HF stripping system. For this example, a 350 g/L $H_2SO_4$ solution is used in the first scrub and a 0.1 M HF solution is used in the second scrub. Both scrubs are at A:O ratios of 1:2. Again, exact conditions are dependent on the specifics of each system. In general, this scrubbing step may include first scrubbing the aqueous solution loaded onto the organic liquid solution with a sulfuric acid solution having a concentration in the range of from about 200 to 500 g/L, and then with a HF solution having a concentration in the range of from about 0 to 0.5 M.

In order to better understand the third, fourth and fifth steps in the process of the present invention, the following explanation is beneficial. It can be shown experimentally that hydrofluoric acid (HF) solutions effectively strip the loaded metals of the tantalum residue in the following order:

Na, $H_2SO_4$> Th, Ti> Zr> Hf> Sc> U

Because scandium occupies an interior position in the stripping sequence, it is necessary to use a two-step stripping process for scandium purification. The first step of the stripping process involves stripping the metals from the organic phase which are to the left of scandium in the stripping sequence (i.e.—referred to herein as the first group of metals). This leaves scandium and the metals to the right of scandium in the stripping sequence (metals to the right of scandium are referred to herein as the second group of metals). The second step of the stripping process involves stripping scandium, leaving the metals to the right of scandium and referred to as the second group of metals (in this example only U), on the organic phase.

Figure 3:
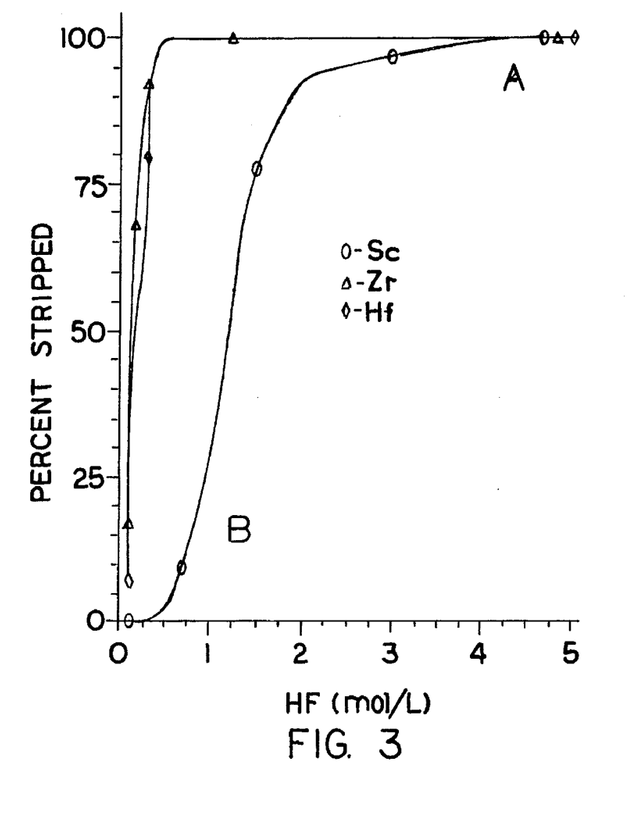
FIG. 3 is a graph illustrating the effect of HF concentration on stripping selected metals from a scandium containing solution utilizing the process of the present invention.

The effect of HF concentration on stripping elements of the first group of metals from the organic phase is shown in FIG. 3. The stripping tests were performed at an A:O ratio of 1:1 with a 10 minute contact time. As can be seen from FIG. 3, a concentration region of selective stripping exists. Between 0.3 and 0.8 M HF, most of the zirconium and hafnium are stripped, while most of the scandium remains in the organic phase. Stripping equilibrium curves can be developed using the loaded organic and a 0.5 M HF stripping solution. Equilibrium points are obtained by varying the A:O ratios, thus keeping metal ratios constant.

Figure 4:
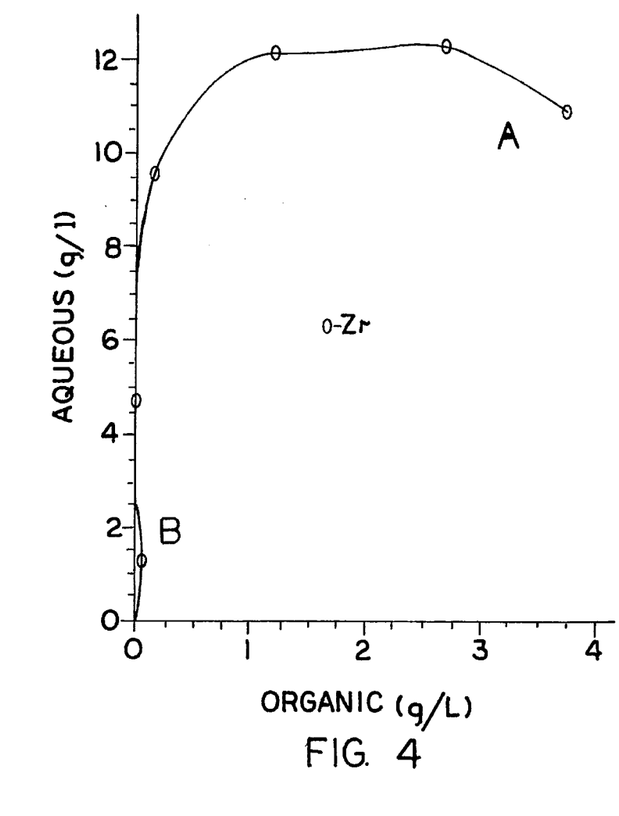
FIGS. 4 through 6 are graphs illustrating the interdependency of metal distributions in the scandium containing solution subjected to the process of the present invention.
Figure 5:
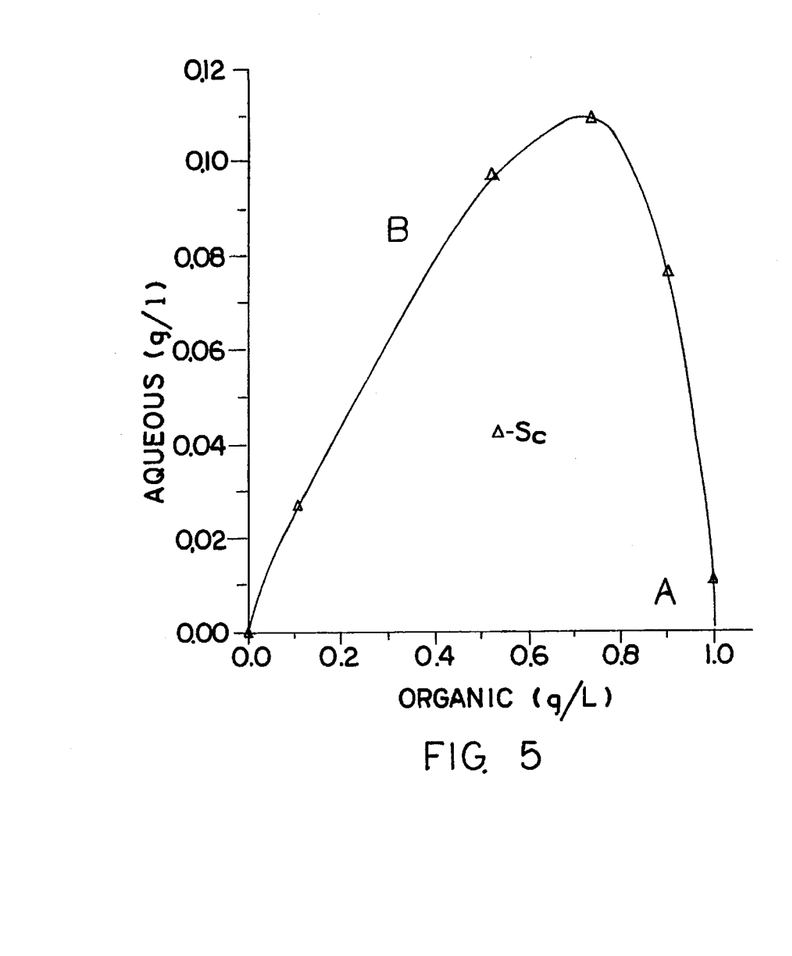
Figure 6:
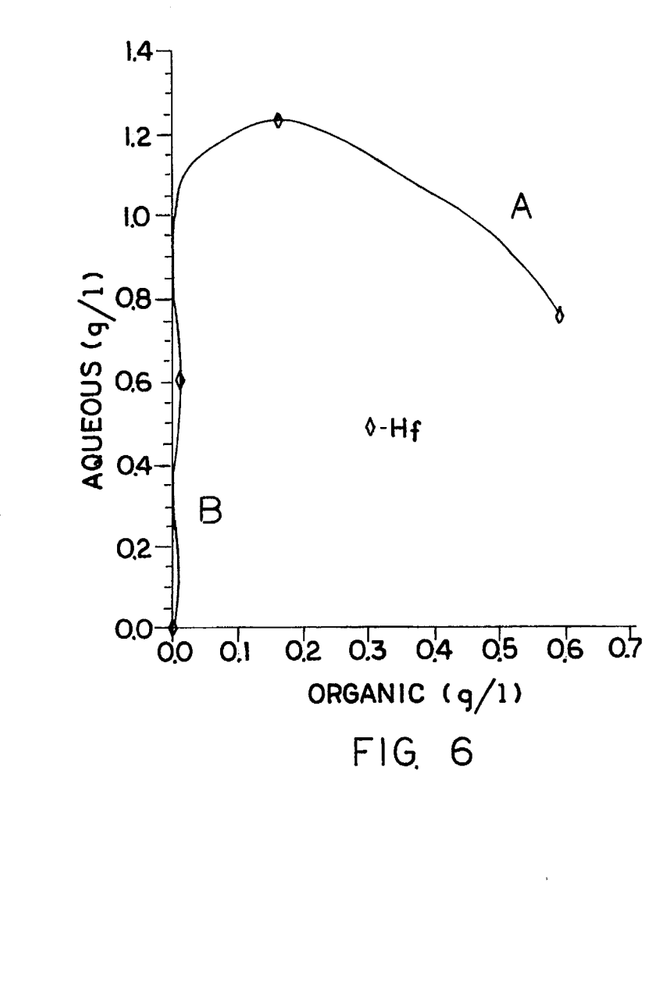

The interdependency of metal distributions can be seen by examining the shape of the equilibrium curves illustrated in FIGS. 4 through 6. In FIG. 5, at high overall metal concentrations on the organic (area A), scandium distribution coefficients (concentration in organic/concentration in aqueous) are very high, greater than 400. However, at lower overall metal concentrations (area B), scandium distribution coefficients are as low as 5.4. As with FIG. 5, areas labelled A and B in FIGS. 4 and 6 represent high overall metal concentrations while areas labelled B represent lower overall metal concentration. FIGS. 4 and 6 also show that hafnium and zirconium have distributions which are interdependent on the other metals. Separation coefficients also vary with metal concentrations and are very favorable, ranging from 1,000 to 20,000 for the Sc-Zr system and 500 to 1,200 for the Sc-Hf system.

Figure 7:
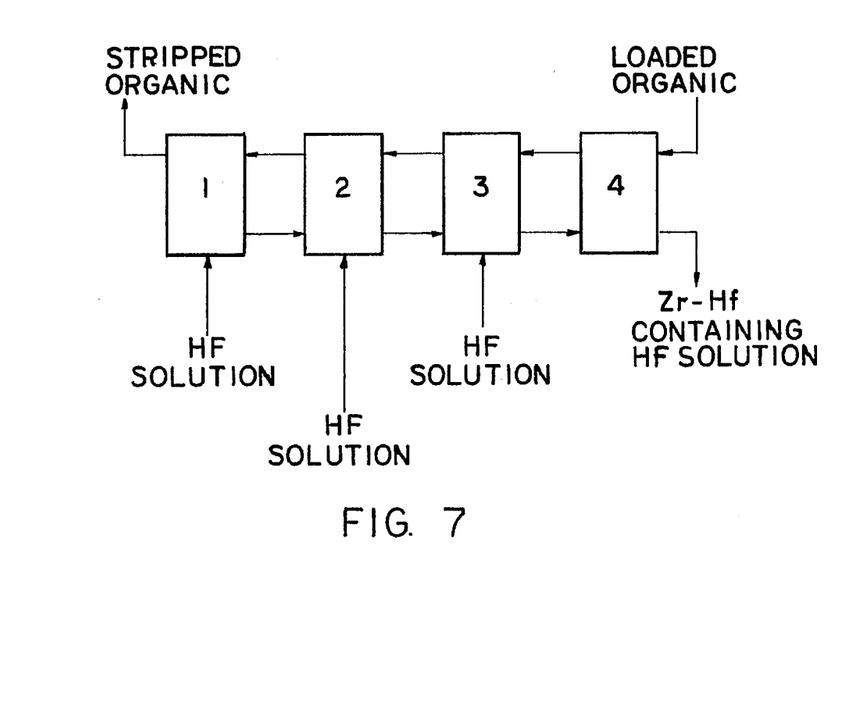
FIG. 7 is a flow diagram illustrating a counter-current multi-stage metal stripping system used in one part the process of the present invention.

With the foregoing explanation in mind, the fourth step in the process of the present invention is executed. After the scrubbing step previously described is completed to remove thorium and other entrained metals to the left of scandium in the stripping sequence, the fourth step in the process is performed to strip the remaining metals to the left of scandium in the stripping sequence (i.e.—the first group of metals). For this example, a 0.5 M HF solution is contacted counter-currently with the loaded organic in four stages. The system is operated at an A:O ratio of 3:5. It again should be noted that conditions of the separation will vary from system to system. Additionally, the type of contact needed can also vary with each system (i.e. counter-current, cross-current, total reflux, or fractional). A traditional counter-current multi-stage stripping system as shown in FIG. 7 is used for this example of the fourth step. This system is sufficient for the fourth step when the following key design requirements are observed: (1) operate the last stage (stage 4, where aqueous liquor exits the system) so that a significant amount of zirconium remains on the organic phase upon leaving the stage. This creates equilibrium conditions which ensure that scandium will greatly favor the organic phase, thereby controlling the amount of scandium lost in the raffinate; and (2) ensure enough stages are used to completely remove zirconium and hafnium from the organic phase. In general, however, this stripping step may be accomplished using a HF solution with a concentration in the range of from about 0.3 to 0.6 M which is contacted with the organic liquid solution.

Figure 8:
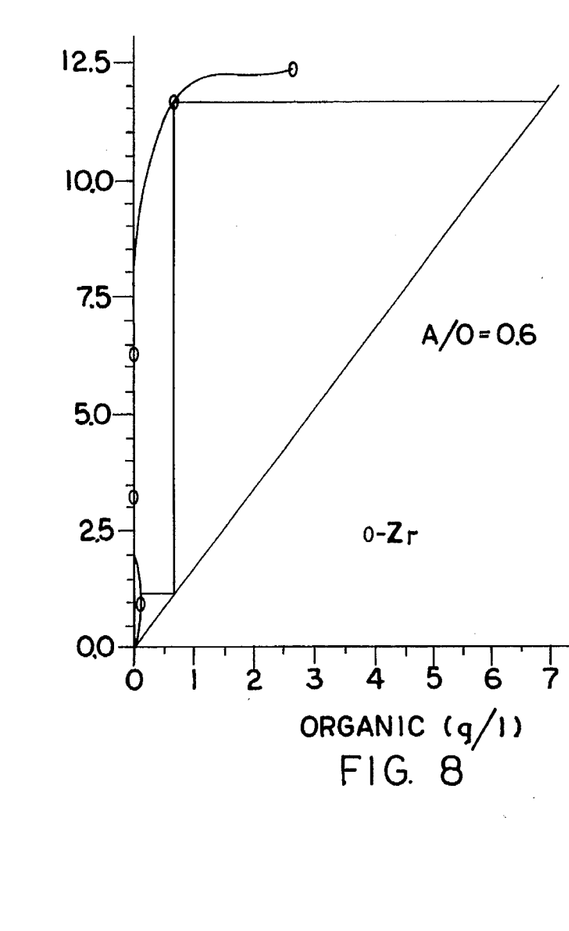
FIG. 8 is a graph illustrating a McCabe-Theile analysis of a zirconium equilibrium curve.

A McCabe-Theile analysis of the zirconium equilibrium curve is illustrated in FIG. 8 and shows how the above criteria (1) and (2) are met. An A:O ratio of 3:5 meets the first design criterion by leaving about 0.5 g/L Zr on the organic exiting the last stage. It is graphically determined that two ideal stages are needed to remove zirconium completely from the organic. To meet the second design criterion, two additional stages are added for a total of four to ensure complete removal of zirconium and hafnium from the organic exiting the system. The A:O ratios in the extra stages are 2:5 and 1:5, respectively. These lower A:O ratios are used to reduce internal scandium recycle since scandium has limited solubility in HF.

The counter-current system shown in FIG. 7 is operated at steady state resulting in separations as shown in Table 1, The system makes a sharp separation with less than 0.1 percent of the loaded scandium lost in the raffinate.

TABLE 1

| RESULTS FROM COUNTER-CURRENT STRIPPING SYSTEM | | |
|---|---|---|
| Metal | Pct exiting on organic | Pct exiting with aqueous |
| Sc | 99.9 | 0.08 ± 0.04 |
| Zr | 0.000 ± 0.001 | 99.99 |
| Hf | 0.00 ± 0.01 | 99.99 |

Figure 9:
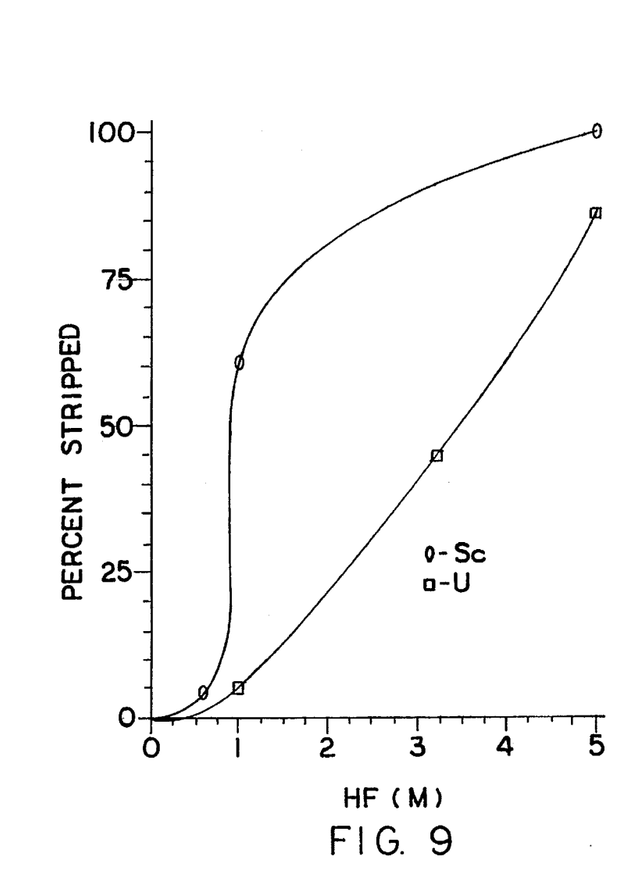
FIG. 9 is a graph illustrating scandium and uranium stripping efficiencies as a function of HF concentration.

FIG. 9 shows scandium and uranium stripping efficiencies as a function of HF concentration. As can be seen, uranium lies to the right of scandium in the stripping sequence.

Figure 10:
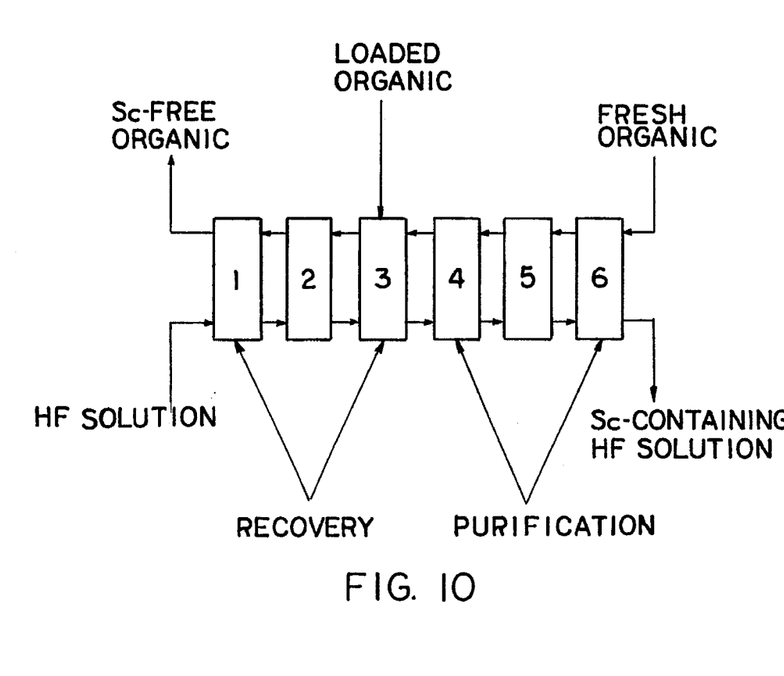
FIG. 10 is a flow diagram illustrating a counter-current multi-stage metal stripping system utilized in the scandium separation process of the present invention.

The fifth and final step in the process of the present invention involves the use of a fractional stripping system to strip scandium from the loaded organic phase liquid solution, leaving the metals to the right of scandium (i.e.—the second group of metals) on the organic. For this example, a 0.7 M HF solution is used in a fractional stripping scheme as shown in FIG. 10. However, the fractional stripping system may use a HF solution with a concentration in the range of from about 0.5 to 5 M.

Figure 11:
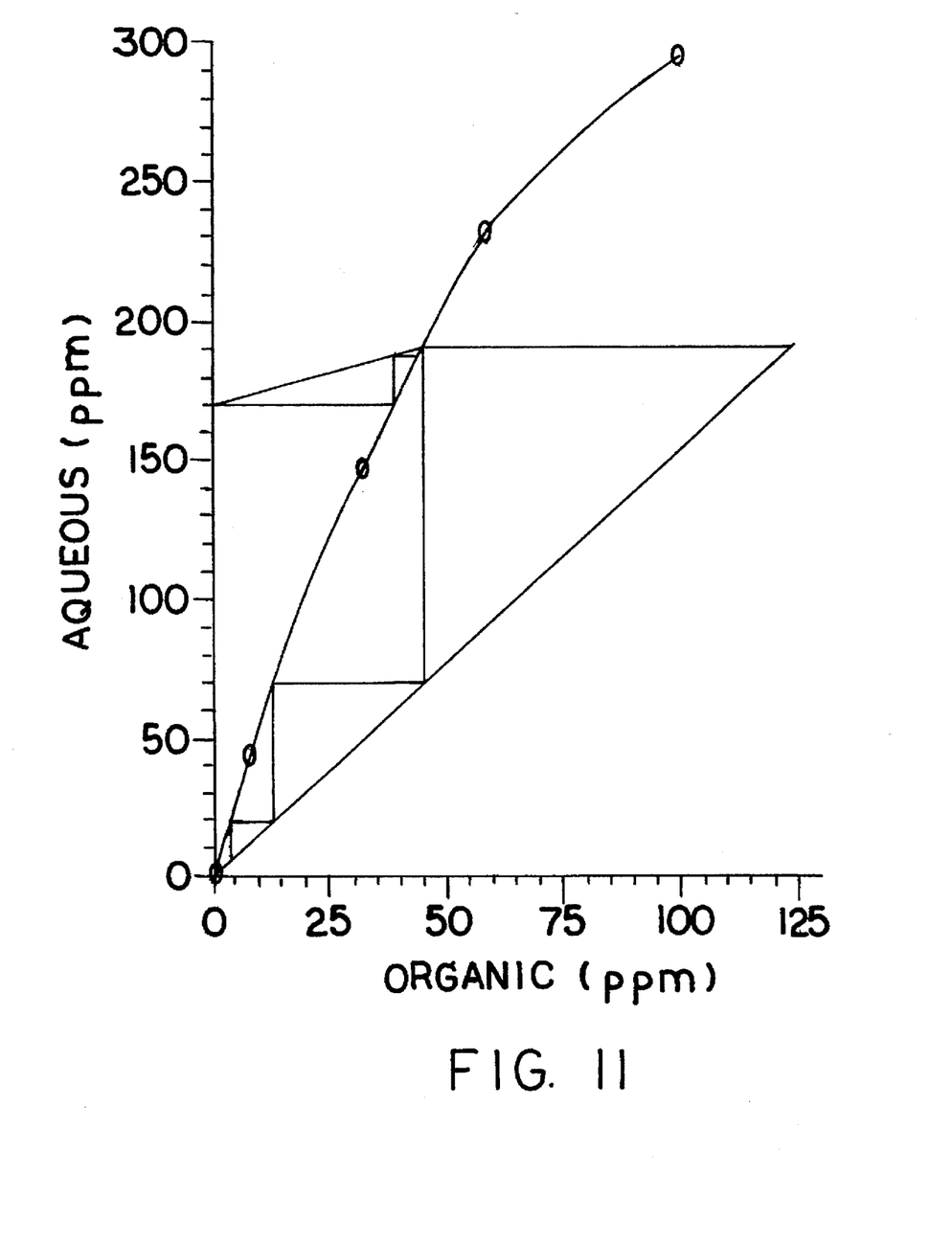
FIG. 11 is a graph illustrating the equilibrium curve and operating lines used in the uranium-scandium separation portion of the flow diagram of FIG. 10.

In total for this example of the fifth step, six stages of fractional stripping are used to separate scandium from uranium. The A:O ratios in the recovery and purification portions are 3:5 and 3:2, respectively. Again it should be noted that conditions of the separation will vary from system to system. A fractional stripping system as illustrated in FIG. 10 is needed because the separation factor for uranium and scandium is not as favorable as in the previous separation. In the recovery portion, the design emphasis is on stripping as much scandium as possible. In the purification portion, loading as much uranium as possible is emphasized. The equilibrium curve and operating lines used in the uranium-scandium separation are shown in FIG. 11. A McCabe-Theile analysis was used to determine the number of stages.

The selection of the operating line for the recovery section of the separation is based on the following: (1) operate stage 3 so that a significant amount of scandium is still left in the organic phase upon leaving the stage. This increases the distribution coefficient of uranium for this stage which in turn minimizes the amount of uranium entering the purification stages; and (2) ensure enough stages are used to completely remove scandium from the organic phase.

The system shown in FIG. 10 is operated at steady state conditions resulting in the separation shown in Table 2.

TABLE 2

RESULTS OF URANIUM-SCANDIUM SEPARATION SYSTEM

| Stream | Scandium (ppm) | Uranium (ppm) |
| --- | --- | --- |
| Aqueous | 170 | <1 |
| Organic | 1 | 73 |

Uranium concentration in the exiting aqueous solution was below the detection limit of the NAA analytical equipment (1 ppm). The process for separating scandium from a tantalum process residue as described herein includes process variables which must be accounted for. The important process variables are:

(1) extractant concentration—when using either di-2-ethylhexyl phosphoric acid or 2-ethylhexyl phosphonic acid, concentrations in the organic phase can vary from 2 volume percent to as high as 30 volume percent depending on the amount of scandium in the aqueous phase, the A:O ratio being used and the amount of coextracting metals to be recovered.

(2) Organic Diluent—these extractants will be effective in both aliphatic and aromatic elluents, however, best results will be seen when using a solvent extraction grade kerosene-based diluent. Additionally, tri-butyl phosphate improves diluent suitability when used as a modified from 5–30 volume percent.

(3) Organic:Aqueous Ratio—the A:O ratio will depend on the design of each specific system and may range from 0.2 to 5.

(4) HF Concentration—HF solutions in the range of 0.1 to 5 M will be effective in removing the loaded metals, with the preferred range of 0.4 to 0.7 M. Scandium has limited solubility in fluoride solutions and this fact must be considered in design calculations.

(5) Stages for the Hafnium, Zirconium and Scandium Separation—the number of stages for this separation can vary widely, 3–15, and will be specific to each system. The number of stages should be selected according to design criteria described previously herein.

(6) Stages for Scandium and Uranium Separation—same as 5, above.

In addition to the important process variables described above which must always be taken into account, it should also be noted that the example given hereinbefore only specifies typical constituents, quantities and compositions. For example, the aqueous sulfuric acid solution which contains the scandium-bearing material may contain in the range of between 5 and 200 g/L of sulfuric acid. In addition, the organic liquid solution may be formed from an aqueous-immiscible diluent comprising a mixture of a major amount of petroleum fractions with either aliphatic or aromatic fractions, or mixtures thereof and a minor amount of modifying agent selected from the group consisting of alcohol, phenols, phosphoric ester or phosphine oxide, and an extractant comprised of an organophosphorus compound selected from the group consisting of monoester or diester, or a mixture of monoester or diester, or phosphoric, phosphonic or phosphinic acids. As stated in the given example, the preferred immiscible diluent is a kerosene derivative containing approximately 22% aromatics, 42% naphthenes and 36% paraffins. In addition, although phosphoric and phosphonic acids were described in the foregoing example, the organophosphorus compound may also be selected from mono-2-ethylhexyl ester, de-2,4,4-trimethyl pentyl phosphonic acid or di-2-ethylhexylphosphinic acid. In all cases, the organophosphorus compound comprises less than 40% by volume of the organic liquid solution, and preferably comprises 15% by volume.

The modifying agent utilized in the process of the present invention and included in the organic liquid solution is a minor amount of polar liposoluble compound comprising a heavy alcohol having between about 4 and 15 carbon atoms or tributyl phosphate, and preferably contains 15% by volume tributyl phosphate.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

I claim:

1. A process for separating scandium from an aqueous solution including a first group of metals, scandium and a second group of metals, comprising the steps of:

(a) providing a scandium-containing material and preparing therefrom an aqueous sulfuric acid solution containing a first group of metals, scandium and a second group of metals;

(b) contacting said aqueous sulfuric acid solution with an organic liquid solution whereby said scandium and said first and second groups of metals are extracted into the organic liquid solution to create a loaded organic liquid solution;

(c) scrubbing said loaded organic liquid solution first with a sulfuric acid solution to remove metals selected in said first group of metals from said loaded organic liquid solution and then with an dilute HF solution to prepare said loaded organic liquid solution for stripping;

(d) stripping the metals remaining in said first group of metals from said loaded organic liquid solution with a HF solution so that only scandium and said second group of metals remain on said loaded organic liquid solution; and (e) using a fractional stripping system to strip said scandium from said loaded organic liquid solution with a HF solution so that said scandium is released from said loaded organic liquid solution and only said second group of metals remains on said loaded organic liquid solution.

2. The process as recited in claim 1, wherein said aqueous sulfuric acid solution is prepared by sulfating and water leaching a tantalum residue.

3. The process as recited in claim 1, where said aqueous sulfuric solution containing said scandium and said first and second groups of metals contains in the range of about 5 to 200 g/L sulfuric acid.

4. The process as recited in claim 1, wherein said organic liquid solution is formed from:

an aqueous-immiscible diluent comprising a mixture of a major amount of petroleum fractions with one of aliphatic fractions, aromatic fractions and mixtures thereof;

a minor amount of a modifying agent selected from the group consisting of alcohol, phenols, phosphoric ester and phosphine oxide; and an extractant comprising an organophosphorus compound selected from the group consisting of monoester, diester, a mixture of monoester and diester, phosphoric, phosphonic and phosphinic acids.

5. The process as recited in claim 4, wherein said aqueous immiscible diluent is a kerosene derivative containing approximately 22% aromatics, 42% naphthenes and 36% paraffins.

6. The process as recited in claim 4, wherein said organophosphorus compound is selected from a group consisting of di-2-ethylhexyl phosphoric acid, 2-ethylhexyl phosphonic acid, mono-2-ethylhexylester, di-2,4,4-trimethyl pentyl phosphonic acid and di-2-ethylhexylphosphinic acid.

7. The process as recited in claim 4, wherein said organophosphorus compound comprises less than 40% by volume of said organic liquid solution.

8. The process as recited in claim 7, wherein said organophosphorus compound is present at a concentration of 15% by volume.

9. The process as recited in claim 4, wherein said modifying agent is a polar liposoluble compound formed from one of a heavy alcohol having between about 4 and 15 carbon atoms and tributyl phosphate.

10. The process as recited in claim 9, wherein said modifying agent contains 15% by volume tributyl phosphate.

11. The process as recited in claim 1, wherein said organic liquid solution consists of 15% by volume de-2-ethylhexyl phosphoric acid and 15% by volume tributyl phosphate diluted in a kerosene derivative containing approximately 22% aromatics, 42% naphthenese and 36% paraffins.

12. The process as recited in claim 1, wherein said organic liquid solution consists of 15% by volume 2-ethylhexyl phosphonic acid and 15% by volume tributyl phosphate diluted in a kerosene derivative containing approximately 22% aromatics, 42% naphthenese and 36% paraffins.

13. The process as recited in claim 1, wherein scrubbing step (c) includes first scrubbing said loaded organic liquid solution with a sulfuric acid solution having a concentration in the range of from about 200 to 500 g/L, and then with a HF solution having a concentration in the range of from about 0 to 0.5 M.

14. The process as recited in claim 1, wherein said stripping step (d) is accomplished using a HF solution with a concentration in the range of from about 0.3 to 0.6 M which is contacted with said loaded organic liquid solution.

15. The process as recited in claim 1, wherein said fractional stripping step (e) is accomplished in a fractional stripping system using a HF solution with a concentration in the range of from about 0.5 to 5 M.

16. The process as recited in claim 15, wherein said fractional stripping system consists of about 2 to 20 stages of separation, one part of said stages being recovery stages and another part of said stages being purification stages.

17. The process as recited in claim 1, wherein:

said first group of metals includes Na, Th, Ti, Zr and Hf; and said second group of metals includes at least U.

18. The process as recited in claim 1, wherein in said scrubbing step (c) said metals selected in said first group of metals includes Th.

* * * * *